INVENTOR.
Nils Folke Larsson
BY
his ATTORNEY

United States Patent Office 3,278,968
Patented Oct. 18, 1966

3,278,968
DEVICE FOR DRIVING WINDSHIELD WIPERS
Nils Folke Larsson, Mariehall, Sweden, assignor to Aktiebolaget Electrolux, Stockholm, Sweden, a corporation of Sweden
Filed Mar. 1, 1965, Ser. No. 436,117
Claims priority, application Sweden, Mar. 6, 1964, 2,850/64
5 Claims. (Cl. 15—250.25)

This invention relates to a device for driving oscillating windshield wipers, particularly on motor vehicles.

Previously known devices for driving two oscillating windshield wipers from a single electric motor employ a motor of the oscillating type from which motion is transmitted to the wiper arm spindles by means of mechanical linkages having rigid components, such as, levers and cranks. Such mechanical linkages formed of rigid components are relatively costly to manufacture and are the cause of a certain amount of annoying noise in the form of knocking sounds occurring at the extreme positions of the windshield wipers. Further, oscillating electric motors are also relatively expensive.

Accordingly, it is an object of this invention to provide a device for driving oscillating windshield wipers by means of a common electric motor, that is, a motor effecting rotation of its shaft continuously in one direction, which device is relatively inexpensive to manufacture and maintain and further is silent in operation.

In accordance with an aspect of this invention, a cord, belt, chain or other similar elongated, closed loop forming means which is at least partly flexible, is arranged to run around pulleys or other drive members with arcuate peripheries which are secured on the wiper arm spindles, and one run of the cord or other closed loop forming means is connected to a crank, at a distance from the axis of rotation of the latter, so that, when the crank is continuously rotated in one direction by a common electric motor, the cord or other closed loop forming means and the pulleys or drive members cooperate to convert the rotation of the crank into simultaneous oscillation of the wiper arm spindles.

In a preferred embodiment of the invention, the pulleys or drive members secured on the wiper arm spindles have their peripheries eccentrically located relative to the axes of the respective wiper arm spindles so as to maintain a substantially constant distance along the closed loop formed by the cord or other means in all positions of the rotated crank.

Figure 1:
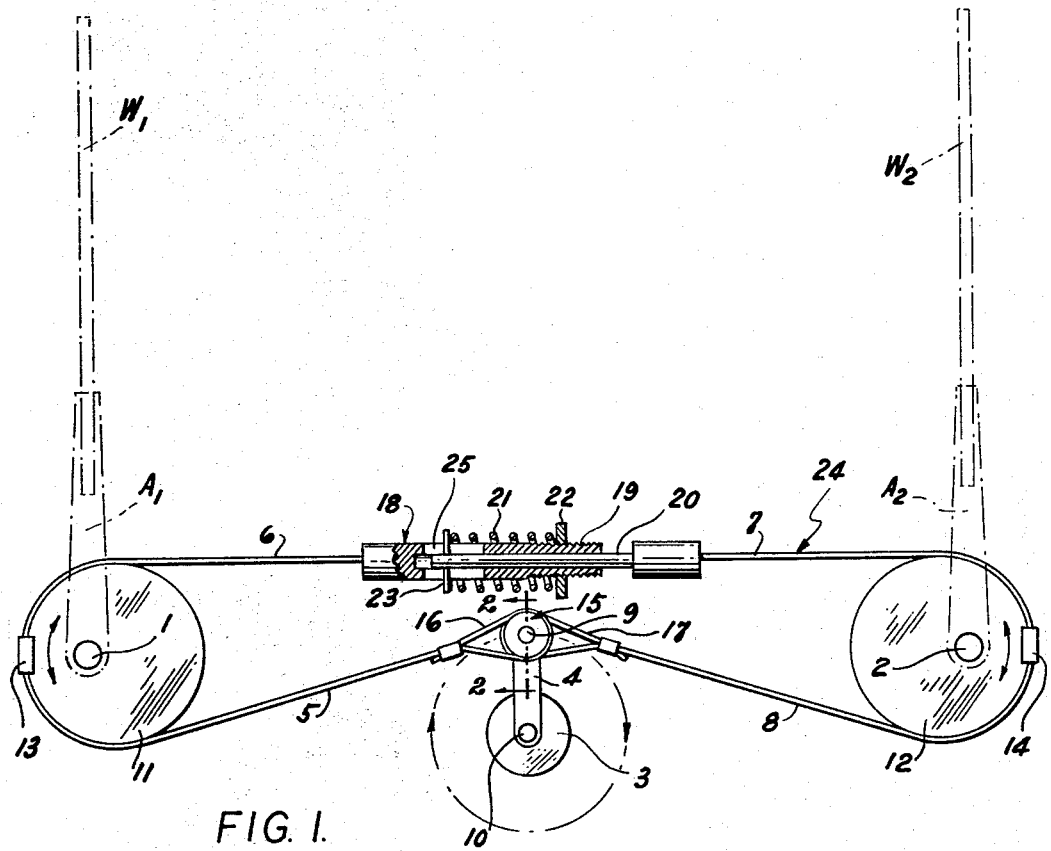
Figure 2:
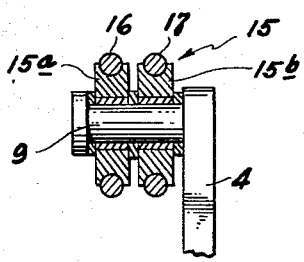

The above, and other objects, features and advantages of the invention, will be apparent in the following detailed description of an illustrative embodiment thereof which is to be read in connection with the accompanying drawing, wherein:

FIG. 1 is a front elevational view, partly broken away and in section, of a device embodying this invention for driving windshield wipers which are shown schematically in broken lines; and FIG. 2 is an enlarged detail sectional view taken along the line 2—2 on FIG. 1.

Referring to the drawing in detail, and intially to FIG. 1 thereof, it will be seen that the device embodying this invention is there shown associated with a pair of oscillating windshield wipers $W_1$ and $W_2$ carried by arms $A_1$ and $A_2$, respectively, which are in turn secured on spindles 1 and 2. The spindles 1 and 2, as is usual, are rotatably supported with their axes directed substantially parallel to each other, and such spindles extend from the outside of the body through the latter into a space behind the instrument panel of the vehicle. In the space behind the instrument panel, there is suitably supported an electric motor and reduction gearing assembly indicated at 3 and operative to drive a shaft 10 continuously in one direction, as indicated by the arrows on FIG. 1. A crank 4 is secured on shaft 10 for rotation with the latter about the axis of such shaft which, in the device shown, preferably extends parallel to the axes of spindles 1 and 2 in a vertical plane approximately midway therebetween.

Drive members 11 and 12 having arcuate peripheries, and which are preferably in the form of pulleys, as shown, are secured on spindles 1 and 2. Elongated transmission means generally identified by the reference numeral 24 forms a closed loop running around the arcuate peripheries of drive members 11 and 12 and having upper and lower runs extending between the drive members, each of the runs being at a different level from the other run and vertically displaced therefrom in its entirety. The closed loop formed by the transmission means 24 is flexible, at least in the parts thereof which run around the drive members 11 and 12.

In the illustrated embodiment of the invention, the closed loop forming transmission means 24 is formed of flexible cord, cable or belting having lengths 5, 6, 7 and 8 which are integrally or otherwise joined, as hereinafter described in detail, and which run around the pulleys 11 and 12, so that reciprocation of the upper and lower runs in opposed directions will cause simultaneous oscillation of the wiper arm spindles 1 and 2 and of the windshield wipers carried thereby. The lower run of the closed loop forming transmission means 24 constituted by the lengths or sections 5 and 8 of cord or the like is connected, approximately at its midpoint, to a crank pin 9 extending from crank 4 at a distance from the axis of rotation of the latter so that, during rotation of the crank with shaft 10, the point of connection of the lower run moves along the circular path followed by crank pin 9 so as to be displaced laterally back and forth and thereby cause oscillation of pulleys 11 and 12.

In order to prevent sharp bending of cord-like lengths 5 and 8 at the point of their attachment to crank pin 9, such attachment is preferably constituted by loops 16 and 17 formed on the ends of lengths 5 and 8, respectively, and engaging around bushing means 15 freely rotatable on crank pin 9. As shown particularly on FIG. 2, the risk of sharp bending of cord-like lengths 5 and 8 is further reduced by providing the bushing means 15 in the form of two separate bushings or grooved rollers 15a and 15b (FIG. 2) receiving the loops 16 and 17, respectively, and being individually turnable on the crank pin 9 so that the cord-like lengths 5 and 8 are free to be oppositely inclined when the crank pin is at the top or bottom of its circular path of movement.

It will be apparent that, as crank pin 9 moves along its circular path, the angle between the directions of cord-like lengths 5 and 8 is alternately increased and decreased, and thereby tends to vary the distance along the closed loop formed by the linear transmission means 24. In order to avoid such change in the distance along the closed loop formed by the transmission means 24 and the consequent increase and decrease in the tension therein, the drive members 11 and 12 have arcuate peripheries that are eccentric with respect to the related spindles 1 and 2. Thus, the pulleys 11 and 12 constituting the drive members in the illustrated embodiment have circular peripheries that are eccentric with respect to their axes of rotation, but it is to be understood that the same effect can be achieved with drive members having non-circular peripheries. In either case, the eccentric peripheries of the drive members 11 and 12 are disposed so that the transmission means 24 forming a closed loop is engaged by portions of the drive members 11 and 12 at a relatively small radial distance from their axes of rotation when the cord-like lengths 5 and 8 are at the maximum angle with respect to each other, as shown on FIG. 1. As the crank pin 9 moves towards a position where the cord-like lengths 5 and 8 come into substantial alignment with each other, the pulleys or drive members 11 and 12 are turned to engage the transmission means 24 with portions of their peripheries disposed at relatively large radial distances from the axes of rotation of spindles 1 and 2.

In order to eliminate slippage of the transmission means 24 relative to the pulleys 11 and 12, the latter are provided with peripheral carriers or clamps 13 and 14 which merely secure or loosely interlock the transmission means 24 to the pulleys 11 and 12 or which may be additionally provided for the purpose of connecting the cord-like lengths 5 and 6 and the cord-like lengths 7 and 8 where such lengths are separately formed.

In order to further ensure the maintenance of a uniform tension in the loop forming transmission means 24 during the operation of the device, such transmission means further preferably includes a tensioning assembly 18 interposed in the upper run of the transmission means 24 between the cord-like lengths 6 and 7. As shown, the tensioning assembly 18 includes a tube 19 extending from the end of cord-like length 6 and slidably receiving a rod 20 secured to the adjacent end of cord-like length 7. A helical compression spring 21 extends around tube 19 and is axially disposed between a nut 22 screwed on external threads formed on tube 19 and a pin 23 extending diametrically through rod 20 and projecting from longitudinal slots 25 formed in tube 19. It will be apparent that adjustment of nut 22 on tube 19 will vary the compression of spring 21 and thereby adjust the force exerted by the spring against nut 22 and pin 23 for tensioning of the transmission means 24. The described tensioning assembly 18 serves to compensate for any stretching of the cord-like lengths 5, 6, 7 and 8 and for any slight changes in the effective distance around the closed loop formed by the transmission means 24 which may be encountered during operation of the drive device.

Although the transmission means 24 of the illustrated embodiment is formed of cord-like lengths 5, 6, 7 and 8, which provide flexibility in the parts running around the pulleys 11 and 12, it will be apparent that the portions of the closed loop which do not run around the pulleys may be formed of rigid elements, for example, rigid links or rods. Further, it will be apparent that the cord-like lengths 5, 6, 7 and 8 may be replaced by chains, in which case the drive members 11 and 12 may be in the form of sprockets eccentrically mounted on spindles 1 and 2 or otherwise having peripheries that are eccentrically disposed relative to the axes of rotation.

Further, it will be seen that the grooved rollers 15a and 15b and end loops 16 and 17 of the bottom run formed by sections 5 and 8 function to enable each of the sections 5 and 8 to move freely on the crank pin 9 with respect to the other in all positions of the crank pin 9 in its path of movement about the axis of rotation of the crank 4 and enable the ends 16 and 17 of the motion transmitting means 24 to be removed from the crank pin 9 without the use of tools.

The top run of the motion transmitting means 24 extends from one pulley 11 to the other pulley 12 and is only supported at its ends by the pulleys. Also, the top and bottom runs of the motion transmitting means 24 and detachable connecting means formed by the end loops 16 and 17 and grooved rollers 15a and 15b are disposed substantially in the same vertically extending plane. Since the end loops 16 and 17 are not directly connected to the crank pin 9 at the same region, the closed loop in a strict sense is formed by the motion transmitting means 24 and the end loops 16 and 17 thereof and the grooved rollers 15a and 15b which are rotatably supported on the pin 9 adjacent to one another.

The pulleys 11 and 12 are recessed at their peripheries to receive members 13 and 14 fixed to the motion transmitting means 24. With this arrangement, a separable mechanical interlock is formed between the pulleys 11 and 12 and motion transmitting means 24 to enable the latter to be removed from the pulleys without the use of tools. The tension adjusting means 18 provides a unique arrangement whereby the tension of the motion transmitting means 24 may be adjusted simply by turning the nut 22 on the externally threaded portion of tube 19. Hence, it is not necessary to remove the motion transmitting means 24 from the pulleys 11 and 12 to adjust the tension adjusting means 18 and the tension of the motion transmitting means 24 can be adjusted without the use of tools simply by turning the nut 22. Accordingly, the closed loop of the improved windshield wiper device described above and shown in the drawing can be easily replaced by another closed loop without the use of tools.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What is claimed is:

1. The combination with a pair of oscillating windshield wipers actuated by an electric motor, of a device comprising:
    (a) a crank driven in one direction by an electric motor about a fixed axis,
    (b) said crank having a pin which is radially removed from the axis about which said crank rotates and substantially parallel thereto,
    (c) a pair of wiper arm spindles turnable about fixed axes which are parallel to and at opposite sides of the fixed axis of said crank, each of said wiper arm spindles carrying a different one of the windshield wipers,
    (d) a pair of pulleys, each of said pulleys being fixed to a different one of said wiper arm spindles,
    (e) an elongated motion transmitting means running about said pair of pulleys and having only two runs extending between said pulleys, one of said runs extending from one of said pulleys to said other pulley and supported at its ends only by said pair of pulleys, the other of said runs being at a different level and vertically displaced in its entirety from said one run, said other run including two sections which respectively extend toward one another from said pair of pulleys and have outer free ends,
    (f) means for removably connecting the outer free end of each of said sections of said other run to said crank pin, said removable connecting means for each section of said other run functioning to enable each of said sections to move freely on said crank pin with respect to the other in all positions of said crank pin in its path of movement about the axis of rotation of said crank and enable the ends of said sections of said motion transmitting means to be removed from said crank pin without the use of tools,
    (g) said motion transmitting means and said crank pin and said means detachably connecting the outer free ends of said sections of said other run to said crank pin forming a closed loop, said closed loop including said detachable connecting means and said pulleys being disposed essentially in the same vertically extending plane, and
    (h) each of said pulleys having a periphery that is eccentric with respect to the axis of said wiper arm spindle to which it is fixed, the eccentricity of the periphery of one of said pulleys with respect to the axis of said wiper arm spindle to which it is fixed counteracting the eccentricity of the other of said pulleys with respect to the axis of said wiper arm spindle to which it is fixed to maintain the linear length of said closed loop substantially the same in all positions of said crank.

2. The device set forth in claim 1 in which said pulleys have peripheries which are circular and each of said pulleys is eccentrically fixed to a different one of said wiper arm spindles to provide for each of said pulleys the periphery that is eccentric with respect to said wiper arm spindle to which it is fixed.

3. A device as set forth in claim 1 in which said means for removably connecting the outer free end of each of said sections of said other run to said crank pin comprises a grooved roller, means for mounting said grooved rollers on said pin with each grooved roller being freely turnable thereon with respect to said other grooved roller, and each of the outer free ends of said sections running about a different one of said grooved rollers extending back toward the pulley from which it comes, and means fixing the extreme outer ends of said sections to regions of said sections removed from the extreme outer ends thereof to form closed end loops on said grooved rollers in each of said sections of said other run of said motion transmitting means, said grooved roller and closed end loop for each section of said other run functioning to enable each of said sections to move freely on said crank pin in all positions of said crank pin in its path of movement about the axis of rotation of said crank and enable the looped ends of said sections on said other run to be removed from said grooved rollers without the use of tools.

4. The device set forth in claim 1 in which each pulley is formed with a recess which extends along its periphery, and members which are fixed to said motion transmitting means at the regions thereof which run about said pulleys, each of said recesses receiving a different one of said last-mentioned members to form a separable mechanical interlock between said pulleys and said motion transmitting means to enable the latter to be removed from said pulleys without the use of tools.

5. The device set forth in claim 1 in which said one run of said motion transmitting means extending between and supported only by said pulleys comprises two sections extending toward one another from said pulleys and having outer free ends, means between the ends of said sections for adjusting the tension of said closed loop, said tension adjusting means comprising a hollow externally threaded sleeve connected to the outer free end of one of said sections and an elongated member connected to the outer free end of the other of said sections which is disposed within said hollow sleeve and axially movable therein, said hollow sleeve having axially extending slots at diametrically opposite ends thereof, said slots being axially removed from the externally threaded portion of said hollow sleeve, a pin fixed to the end of said elongated member within said hollow sleeve, said pin being transverse to the axis of said hollow sleeve and extending radially outward through the slots therein, a nut threadedly connected to the externally threaded portion of said hollow sleeve and a helical coil spring which is disposed about said hollow sleeve between said pin and said nut, said helical coil spring functioning to maintain said closed loop under tension, and said nut being axially movable on the threaded portion of said hollow sleeve to adjust the tension of said closed loop without removing the latter from said pulleys and without the use of tools.

References Cited by the Examiner

UNITED STATES PATENTS

| 562,124 | 6/1896 | Doolittle | 74—82 |
| 2,012,254 | 8/1935 | Oishei | 15—250.25 |
| 2,538,344 | 1/1951 | Wahlberg | 15—250.25 X |
| 2,577,125 | 12/1951 | Horton | 15—250.25 |

FOREIGN PATENTS

| 614,050 | 9/1926 | France. |
| 1,210,786 | 10/1959 | France. |
| 951,132 | 10/1956 | Germany. |
| 957,278 | 1/1957 | Germany. |

FRED C. MATTERN, JR., *Primary Examiner.*

BROUGHTON G. DURHAM, *Examiner.*

D. H. THIEL, *Assistant Examiner.*